(12) United States Patent
Kawamoto (10) Patent No.: US 7,818,030 B2
(45) Date of Patent: Oct. 19, 2010

(54) CAMERA-EQUIPPED WIRELESS COMMUNICATIONS TERMINAL, AND CLOCK SIGNAL SUPPLY METHOD

(75) Inventor: Yukihiro Kawamoto, Yamatotakada (JP)

(73) Assignee: Kyocera Corporation, Kyoto (JP)

( * ) Notice: Subject to any disclaimer, the term of this patent is extended or adjusted under 35 U.S.C. 154(b) by 1337 days.

(21) Appl. No.: 11/314,571

(22) Filed: Dec. 20, 2005

(65) Prior Publication Data

US 2006/0146145 A1 Jul. 6, 2006

(30) Foreign Application Priority Data

Jan. 5, 2005 (JP) ............................. 2005-000929

(51) Int. Cl.
*H04M 1/00* (2006.01)
(52) U.S. Cl. .................. 455/556.1; 455/553; 455/575.7
(58) Field of Classification Search .............. 455/556.1, 455/553, 575.74
See application file for complete search history.

(56) References Cited

U.S. PATENT DOCUMENTS 5,794,159 A * 8/1998 Portin ..................... 455/553.1

7,181,239 B2 * 2/2007 Yamamoto et al. ....... 455/556.1

FOREIGN PATENT DOCUMENTS

| JP | 2003-008980 | 1/2003 |
| JP | 2004-88447 | 3/2004 |
| JP | 2004-179861 | 6/2004 |
| JP | 2004-312092 | 11/2004 |

* cited by examiner

*Primary Examiner*—Lester Kincaid
*Assistant Examiner*—Charles Shedrick (57) ABSTRACT

A camera-equipped wireless communications terminal includes: a communications unit for communicating with a wireless base station by selective use of one of a plurality of FDD communications methods, each having a different gap between a transmission frequency band and a reception frequency band; a camera module for receiving a clock signal and performing image capture; and a clock supplying unit for varying a frequency of the clock signal depending on the selected FDD communications method and supplying the clock signal to the camera module.

4 Claims, 9 Drawing Sheets

| COMMUNICATIONS MODE | TRANSMISSION BAND | RECEPTION BAND | TRANSMISSION AND RECEPTION FREQUENCY GAP |
|---|---|---|---|
| PCS | 1850-1910MHz | 1930-1990MHz | 80MHz |
| CELLULAR | 824-849MHz | 869-894MHz | 45MHz |

| COMMUNICATIONS MODE | FREQUENCY DIVISION RATIO | CLOCK |
|---|---|---|
| PCS | 1475 | 3.02MHz |
| CELLULAR | 1514 | 3.10MHz |

CAMERA-EQUIPPED WIRELESS COMMUNICATIONS TERMINAL, AND CLOCK SIGNAL SUPPLY METHOD

This application is based on an application No. 2005-000929 filed in Japan, the contents of which are hereby incorporated by reference.

BACKGROUND OF THE INVENTION (1) Field of the Invention

The present invention relates to a camera-equipped wireless communications terminal, and in particular to a technique for suppressing interference.

(2) Description of the Related Art

Recently, mobile telephones, PDAs (Personal Digital Assistants), and the like which include imaging devices, referred to here as camera-equipped wireless communications terminals, have been widely embraced by consumers.

Camera-equipped wireless communications devices employing the communications method known as the FDD (Frequency Division Duplex) method split the frequency band that is to be used into transmission-use frequencies and a reception-use frequencies in order to realize simultaneous transmission and reception. However, in some instances the clock signal supplied to the camera module combines, as noise, with the transmission signal, causing the transmission frequency to approach to the reception frequency, and interference to occur in the reception circuit.

To be more specific about the cause of this phenomenon, the intermodulation product of the clock frequency supplying the camera module and the transmission frequency—the sum or difference of the transmission frequency and an $n^{th}$ harmonic (where n is a natural number) of the clock frequency—approaches a value close to the reception frequency, causing interference to occur. In order to avoid this, a method is conceivable by which the transmission frequency and the clock frequency are adjusted and set at the design stage such that the intermodulation product lies away from the reception frequency.

However, when a camera-equipped wireless communications terminal of the type that supports multiple bands communicates with a wireless base station through selective use of one of the plurality of FDD communication methods, each of which has a different gap between the transmission frequency band and the reception frequency band, the intermodulation product varies according to which FDD communications method is selected, and consequently, the method described above cannot be applied.

SUMMARY OF THE INVENTION

It is an object of the present invention to provide a camera-equipped wireless communications terminal and clock signal supply method capable of protecting against interference caused by the clock signal supplying the camera in a camera-equipped wireless communications terminal of the type that supports multiple FDD bands.

In order to achieve the object, the camera-equipped wireless communications terminal of the present invention is a camera-equipped wireless communications terminal including: a communications unit operable to communicate with a wireless base station by selective use of one of a plurality of FDD communications methods, each having a different gap between a transmission frequency band and a reception frequency band; a camera module operable to receive a clock signal and perform image capture; and a clock supplying unit operable to vary a frequency of the clock signal depending on the selected FDD communications method and supply the clock signal to the camera module.

Further, the clock signal supply method of the present invention is a clock signal supplying method used in a camera-equipped wireless communications terminal that includes a communications unit and a camera module, wherein the communications unit communicates with a wireless base station by selective use of one of a plurality of FDD communications methods, each of which has a different gap between a reception frequency band and a transmission frequency band, and the clock signal is supplied to the camera module and is varied depending on the selected FDD communications method.

With this construction, varying the frequency of the clock signal supplying the camera module to a suitable value depending on the FDD communications method being used by the communications unit enables the intermodulation product to be kept apart from the reception frequency, and consequently enables interference due to the clock signal to be prevented.

Further, the communications unit may transmit a signal of a frequency within a transmission frequency band of the selected FDD communications method, and receive a signal of a frequency within a reception frequency band of the selected FDD communications method, and the frequency of the clock signal supplied to the camera module by the clock supplying unit may be selected such that a sum of, or difference between, an $n^{th}$ harmonic, where n is a natural number, of the frequency of the clock signal and the frequency of the transmitted signal is outside the reception frequency band.

With this construction, the intermodulation product falls outside the predetermined frequency bandwidth allotted to the reception signals, and consequently enables interference to be prevented.

Further, the clock supplying unit may be an PLL frequency synthesizer that selectively generates one of a plurality of clock signals that differ in frequency.

Using a single PLL synthesizer, it is possible to selectively supply at least two clock signals, each having a different frequency to the one or more other clock signals, to the camera module.

Further, the clock supplying unit may include a plurality of oscillators, each of which generates a clock signal that differs in frequency from the clock signals generated by the other oscillators and selectively supply, depending on the selected FDD communications method, one of the plurality clock signals to the camera module.

With this construction, it is possible to selectively supply the clock signal generated by one of the oscillators.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT(S)

A camera-equipped mobile telephone that is the first embodiment of the present invention is described below with reference to the drawings.

Construction

Figure 1:
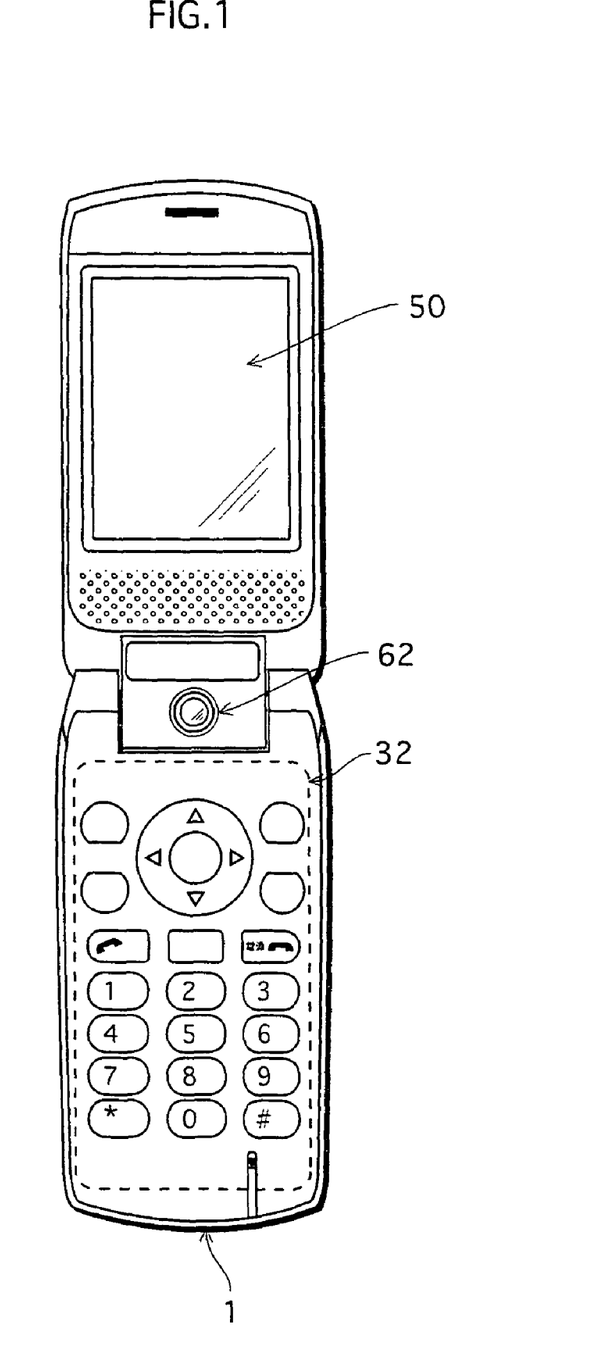
FIG. 1 is an external view of a camera-equipped mobile telephone 1.
Figure 2:
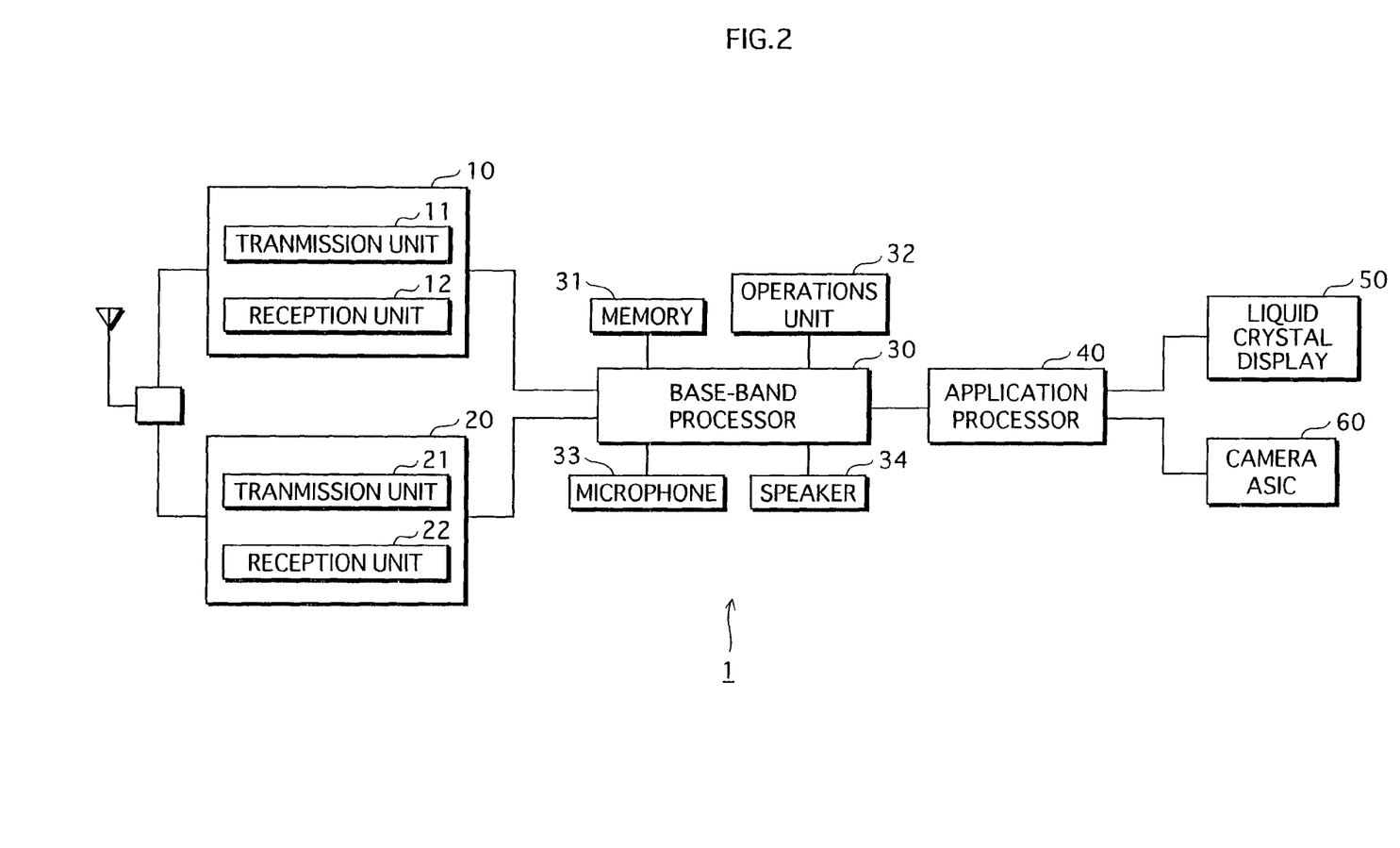
FIG. 2 shows the construction of the camera-equipped mobile telephone 1.

FIG. 1 shows an exterior view of a camera-equipped mobile telephone 1, and FIG. 2 is a block diagram showing the construction of the camera-equipped mobile telephone 1.

The camera-equipped mobile telephone 1 shown in FIG. 1 and FIG. 2 is a dual band-supporting camera-equipped mobile telephone and includes a PCS-use (Personal Communications Service) RF unit 10, a cellular-use RF unit 20, a base-band processor 30, memory 31, an operations unit 32, a microphone 33, a speaker 34, an application processor 40, a liquid crystal display 50, and a camera ASIC 60.

The PCS-use RF unit 10 is constructed from hardware including an antenna interface circuit, a communications circuit, a modulation and demodulation circuit, and the like, and includes a transmission unit 11 and a reception unit 12.

The PCS-use RF unit 10 communicates with a base station using a 1900 MHz band and by means of a FDD-CDMA (Code Division Multiple Access) method.

The cellular-use RF unit is constructed from hardware including an antenna interface circuit, a communications circuit, a modulation and demodulation circuit, and the like, and includes a transmission unit 21 and a reception unit 22.

The cellular-use RF unit 20 communicates with the base station using an 800 MHz band and by means of the FDD-CDMA method.

The base-band processor 30 is connected to the PCS-use RF unit 10, the cellular-use RF-unit 20, the application processor 40, the memory 31, the operations unit 32, the microphone 33, and the speaker 34.

Besides performing voice A/D and D/A conversion processing and signal conversion processing, compression and decompression for the transmission and reception of various signals, processing the inputs and outputs for telephone number input or phonebook reading, and the like, the base-band processor 30 monitors the electric field strength of the reception signal, and thereby functions to detect the occurrence of events at which the communications method is to be switched.

On detecting the occurrence of an event at which the communications method is to be switched, the base-band processor 30 switches the communications method by selectively activating the PCS-use RF unit 10 or the cellular-use RF unit 20, causes the activated PCS-use RF unit 10 or the cellular-use RF unit 20 to perform a channel search, and communicates using the detected channel.

Here, an event at which the communications method is to be switched occurs, for instance, when the control channels of both communication methods are being cyclically monitored and the sensitivity of the control channel of the communications method not currently in use is found to be preferable, when the reception sensitivity of the communications method currently in use is being monitored and a deterioration occurs in the reception sensitivity, and in other similar circumstances.

When the base-band processor 30 has switched the communications method, it outputs, to the applications processor 40, a switching signal indicating that the communications method has been switched.

The application processor 40 is an integrated circuit for performing multimedia processing of moving pictures, still images, sound data, and the like, and is connected to the base-band processor 30, the liquid crystal display 50, and the camera ASIC 60.

The liquid crystal display 50 is a display for displaying images taken using the camera ASIC 60, and the like.

The camera ASIC 60 is an integrated circuit that includes an image capture function.

Construction of Application Processor 40 and Camera ASIC 60

Here, the detailed constructions of the application processor 40 and the camera ASIC 60 are described.

Figure 3:
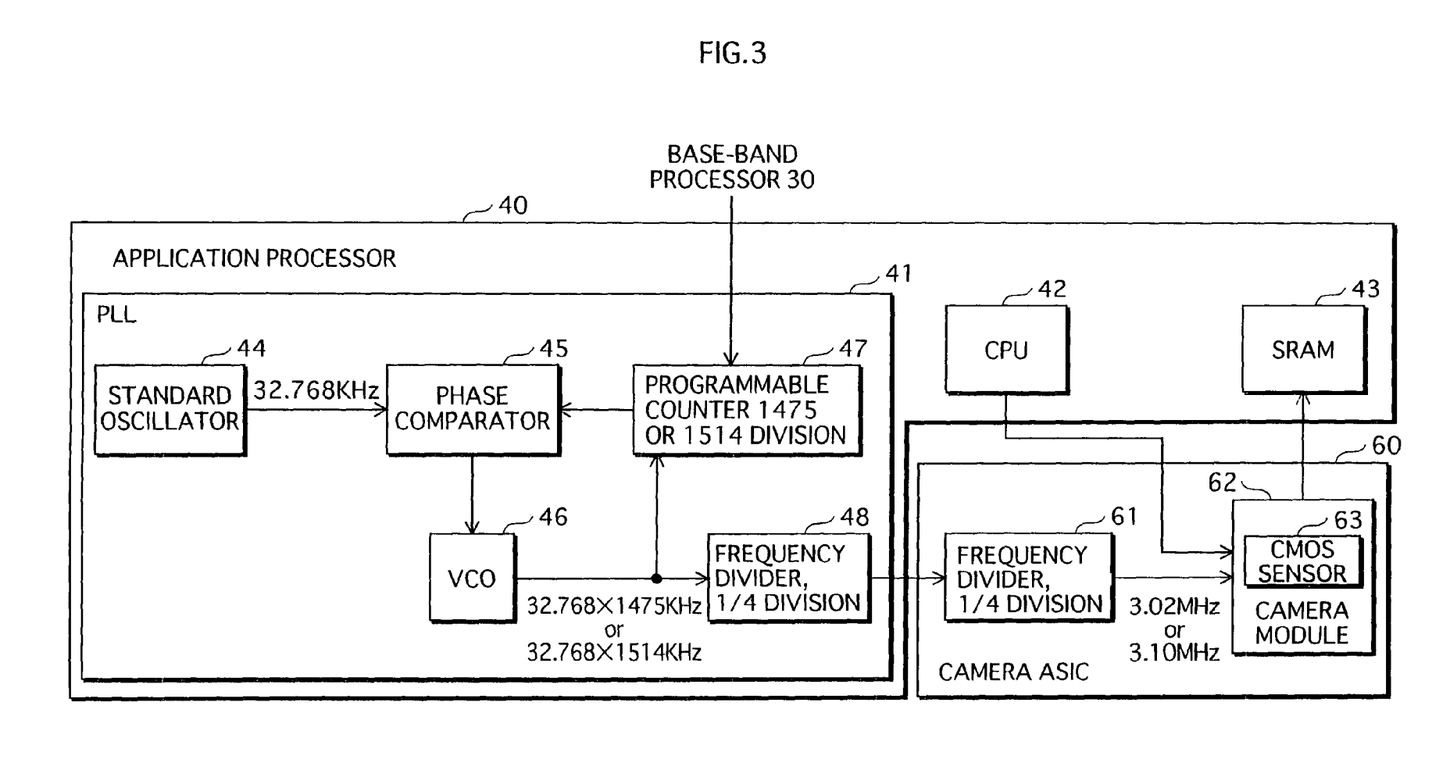
FIG. 3 is a block diagram showing the constructions of an application processor 40 and a camera ASIC 60.

FIG. 3 is a block diagram showing the constructions of the application processor 40 and the camera ASIC 60.

The application processor 40 includes a PLL (Phase Locked Loop) circuit 41, and a CPU 42 that inputs various types of control signal according to user instructions and the like into the camera, and SRAM 43 that is memory for storing images taken using the camera ASIC 60.

The PLL circuit 41, which is also known as a PLL frequency synthesizer, generates clock signals of different frequencies according to whether the communications method being used is the PCS method or cellular method, and supplies the clock signal to the camera.

The PLL circuit 41 includes a reference oscillator 44, a phase comparator 45, a VCO (Voltage Controlled Oscillator) 46, a programmable counter 47, and a frequency divider 48.

The reference oscillator 44 is an oscillator that uses a crystal oscillator or the like, and outputs a clock signal of 32.768 kHz.

The phase comparator 45 compares the frequency of the clock signal outputted by the reference oscillator 44 and the frequency of the signal outputted by the programmable counter, and outputs a voltage corresponding to the difference between the two.

With this construction, when, for instance, the programmable counter 47 signal frequency is higher than the clock signal frequency, the phase comparator outputs a frequency-lowering voltage signal to the VCO 46.

The VCO 46 is an oscillator that outputs a signal of a frequency that differs according to the voltage of the signal from the phase comparator 46, outputting a signal of a frequency of 32.768×1475 kHz when the PCS-use RF unit 10 is being used to communicate, and a signal of a frequency of 32.768×1514 kHz when the cellular-use RF unit 20 is being used to communicate.

The programmable counter 47 has a flag that switches between the values of 1 and 0 according to a switching signal from the base processor 30, and switches between the two types of frequency divider depending on the value indicated by the flag. Note that this flag may be held by a component other than the programmable counter 47.

Dividing ratios of 1475 and 1514 exist, 1475 corresponding to the PCS-use RF unit 10, and 1514 corresponding to the cellular-use RF unit 20.

The frequency divider 48 quarters the frequency of the signal outputted from the VCO 46, and outputs the result. Thus, the frequency divider 48 divides the frequency to give a signal of a frequency of 32.768×1475×¼ kHz when the PCS-use RF unit 10 is being used to communicate, and a signal of a frequency of 32.768×1475×¼ kHz when the cellular-use RF unit 20 is being used to communicate.

The camera ASIC 60 includes a frequency divider 61 and a camera module 62.

The frequency divider 61 quarters once again the frequency of the signal from the frequency divider 48, and supplies the result to the camera module 62 as a camera clock.

Thus, the frequency divider 61 outputs a signal of 32.768× 1475×¼×¼=3.02 MHz as the camera clock signal when the PCS-use RF unit 10 is being used to communicate, and a signal of 32.768×1514×¼×¼=3.10 MHz as the camera clock signal when the cellular-use RF unit 20 is being used to communicated.

The camera module 62 is supplied with the camera clock from the frequency divider 61 and operates accordingly, capturing subject images using a CMOS sensor 63, and outputting the data of the captured image to the application processor 40.

Communication Bands

Figure 4A:
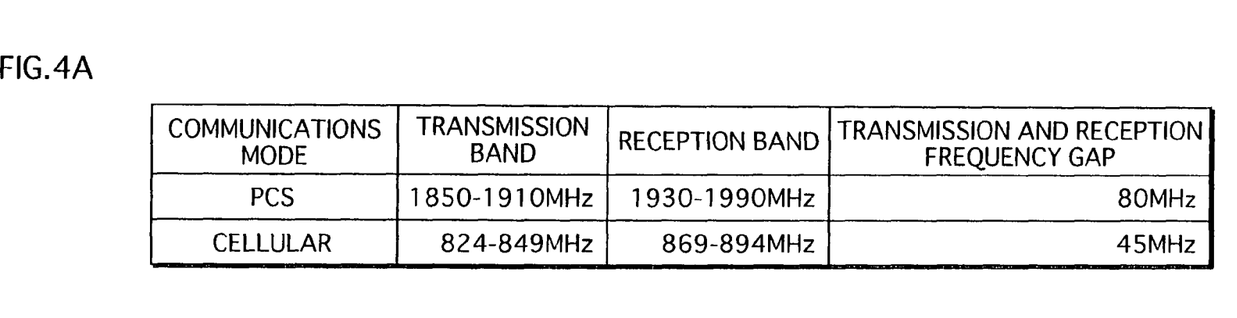
FIG. 4A is a table showing the frequency bands for the various communication methods.
Figure 4B:
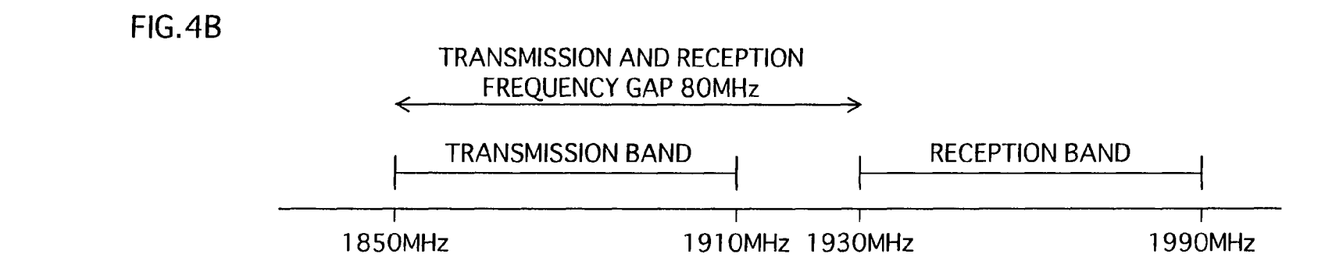
FIG. 4B shows a PCS communications frequency band.
Figure 4C:
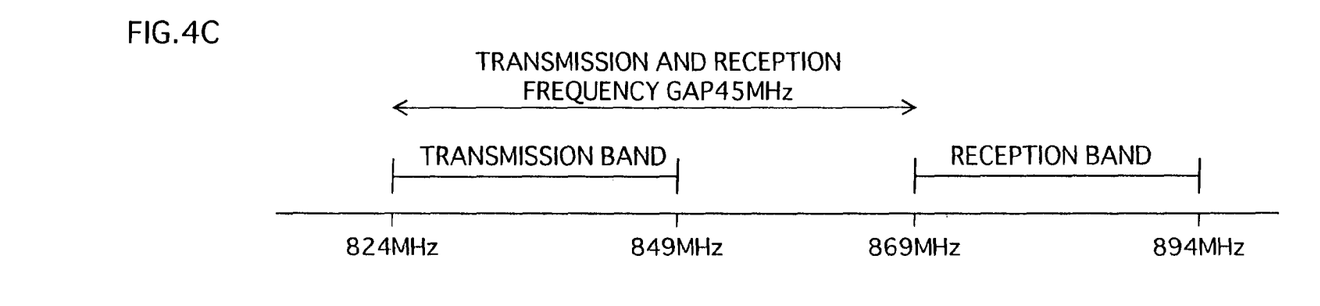
FIG. 4C shows a cellular communications frequency band.

FIG. 4A is a table showing the communications bands used by the PCS and cellular communication methods respectively, FIG. 4B is a diagram specifically showing the PCS communication band, and FIG. 4C is a diagram specifically showing the cellular communications band.

As shown in FIG. 4A, the transmission frequency band of PCS is 1850 MHz to 1910 MHz inclusive, and the reception frequency band is 1930 MHz to 1990 MHz. Further, the transmission and reception frequency gap is 80 MHz.

On the other hand, the transmission frequency band of the cellular method is 824 MHz to 849 MHz inclusive, and the reception frequency band is 869 MHz to 894 MHz inclusive. Further, the transmission and reception frequency gap is 45 MHz.

Camera Clock

Figure 5:
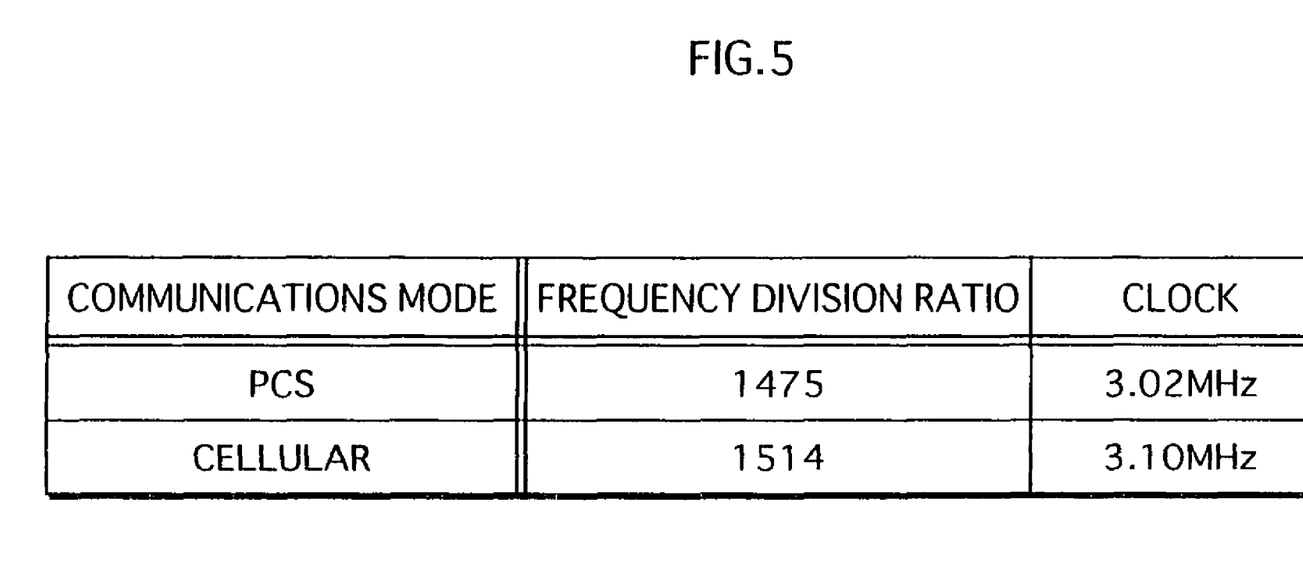
FIG. 5 is a table showing the correspondences between the dividing ratio for the programmable counter in each communications method.

FIG. 5 shows the correspondence, in each of the communications methods, between the camera clock inputted by the camera module 63 and the dividing ratio of the programmable counter 47.

When the camera-equipped mobile telephone 1 is communicating using the PCS-use RF unit 10, the dividing ratio of the programmable counter 47 is 1475, and for this period the camera clock frequency supplied to the camera module 63 is 3.02 MHz. When, on the other hand, the camera-equipped mobile telephone 1 is communicating using the cellular-use RF unit 20, the dividing ratio of the programmable counter 47 is 1514, and for this period the camera clock frequency supplied to the camera module is 3.10 MHz.

Operations

Hereafter, the operations of the camera-equipped mobile telephone 1 are described.

Figure 6A:
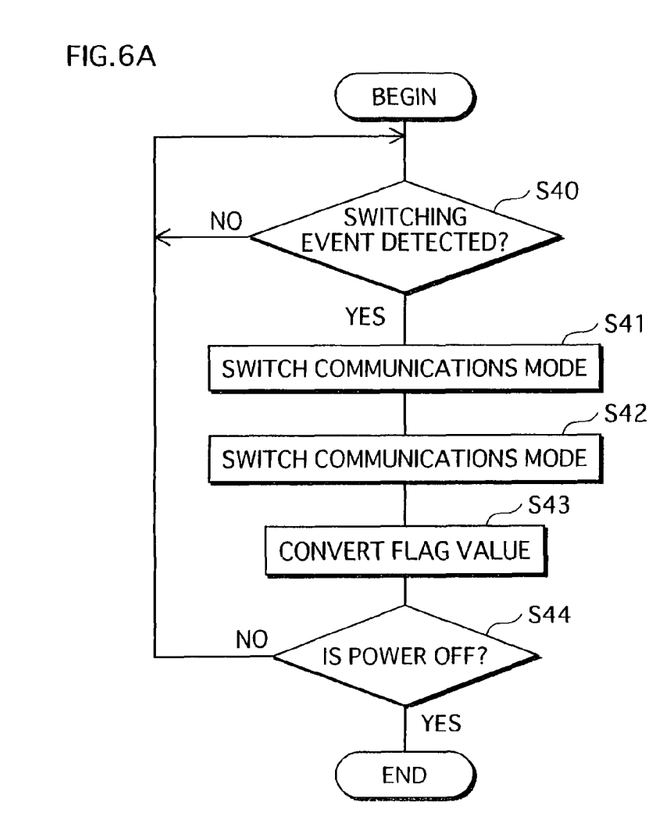
FIG. 6A is a flow-chart showing the process of switching between communications methods.

FIG. 6A is a flowchart showing the processing for switching the communications method.

First, on detecting a communications method switching event (Step S40: YES), the base-band processor 30 selectively switches to one of the PCS-use RF unit 10 and the cellular use RF-unit 20, and activates the selected unit (Step S41), causes channel scanning to be performed, and starts a standby state (Step S42).

At this point, the base-band processor 30 outputs a switching signal to the application processor 40, and changes the value of the flag in the programmable counter 47 of the application processor 40 from 0 to 1, or from 1 to 0 (Step S43). The value of the flag is 0 for the PCS method, and 1 for the cellular method.

Next, if the camera-equipped mobile telephone 1 receives, by means of a user operation to the operations unit 32, an instruction to switch off (Step S44: YES), the base-band processor 30 terminates its processing. If an instruction to switch off is not received (Step 44: NO), the base-band processor 30 proceeds to Step S40.

Figure 6B:
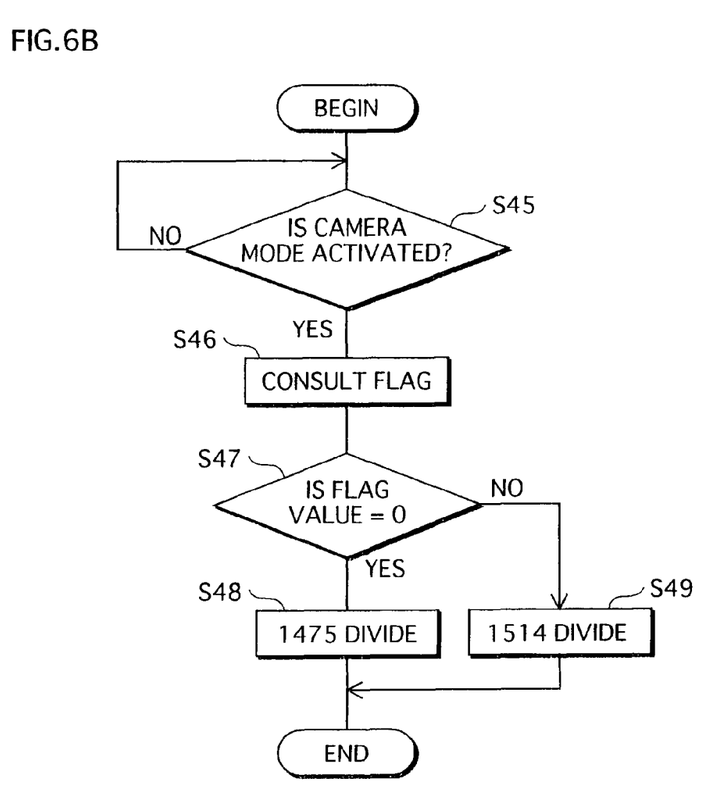
FIG. 6B is flow-chart showing the processing at camera-mode activation.

FIG. 6B is a flowchart showing the processing of camera method activation.

When activation of the camera is instructed by a user operation, the application processor 40 activates the PLL circuit 41, and the CPU 42 activates the camera ASIC 60 (Step S45).

The programmable counter 47 refers to the flag (Step S46), and when the flag value is 0 (Step S47: YES) divides the frequency using the dividing ratio 1475 (Step S48), and when the flag value is 1 (Step S47: NO) divides the frequency using the dividing ratio 1514 (Step S49).

Here, the reasons why, as a consequence of the operations of the above-described camera-equipped mobile telephone, interference ceases to occur are described with reference to FIG. 7A, FIG. 7B, FIG. 8A and FIG. 8B.

Figure 7A:
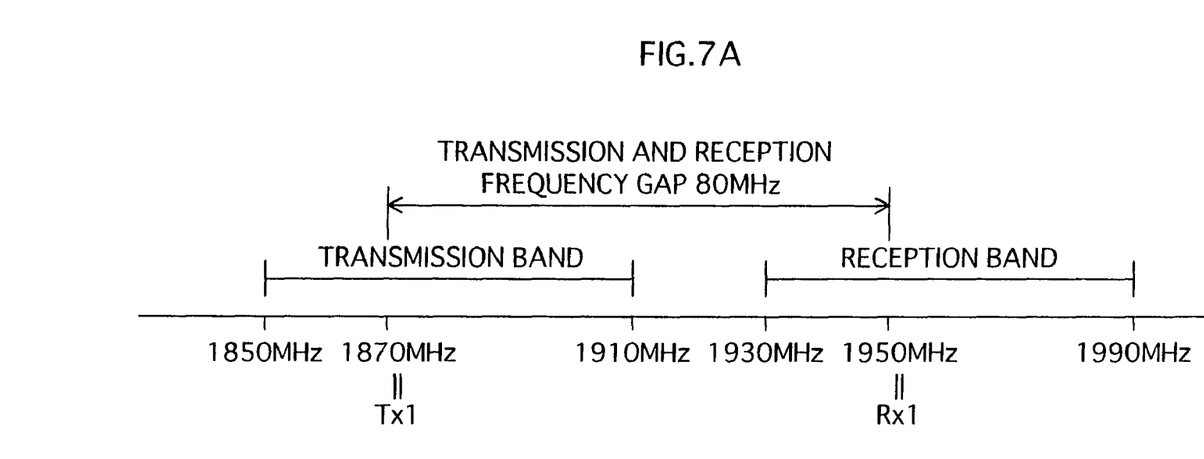
FIG. 7A shows the PCS communications frequency band.

Consider the case in which camera-equipped mobile telephone is communicating, initially without the camera having been operated, using the PCS-use RF unit 10 at the channel frequency shown in FIG. 7A. In such a case, the transmission frequency is Tx1=1870 MHz, and the reception frequency is Rx1=1950 MHz.

When communication is being performed using the PCS-use RF unit 10 and the camera ASIC 60 is activated, a camera clock of 3.02 MHz is supplied to the camera module 62.

Figure 8A:
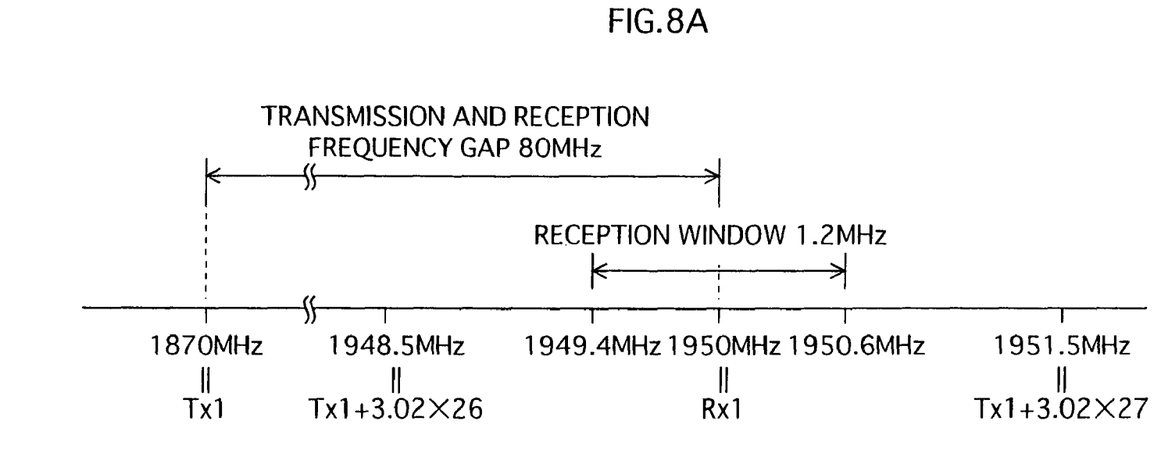
FIG. 8A shows an example of the relationship between the PCS reception frequency and an intermodulation product frequency.

The relationship between the sum of the transmission frequency Tx1 and the $n^{th}$ harmonic of the camera clock frequency with the reception frequency Rx1 at this point is that shown in FIG. 8A.

The sums of the transmission frequency Tx1 and the $n^{th}$ harmonic of the camera clock frequency in the region of the reception frequency Rx1 are approximately 1948.5 MHz (=Tx1+3.02×26) and approximately 1951.5 MHz (=Tx1+ 3.02×27) respectively. These two values are each separated from the reception frequency Rx1=1950 MHz by approximately 1.5 MHz.

The reception circuit of the PCS-use RF unit 10 uses an RF filter to extract reception signals from a reception window (1949.4 MHz to 1950.6 MHz), which is centered on a target value of reception frequency Rx1 and is 1.2 Mhz in width.

The two values, 1948.5 MHz and 1951.5 MHz, fall outside the reception window which ranges from 1949.4 MHz to 1950.6 MHz inclusive, and the RF filter of the PCS-use RF unit 10 is therefore able remove signals having frequencies of these values. Consequently, interference does not occur.

Next, consider the case in which the camera has not been activated and the camera-equipped mobile telephone 1 detects a switching event, and switches from the PCS to the cellular communications band. In this case, the camera-equipped mobile telephone 1 begins communication at the channel frequency shown in FIG. 6B.

Figure 7B:
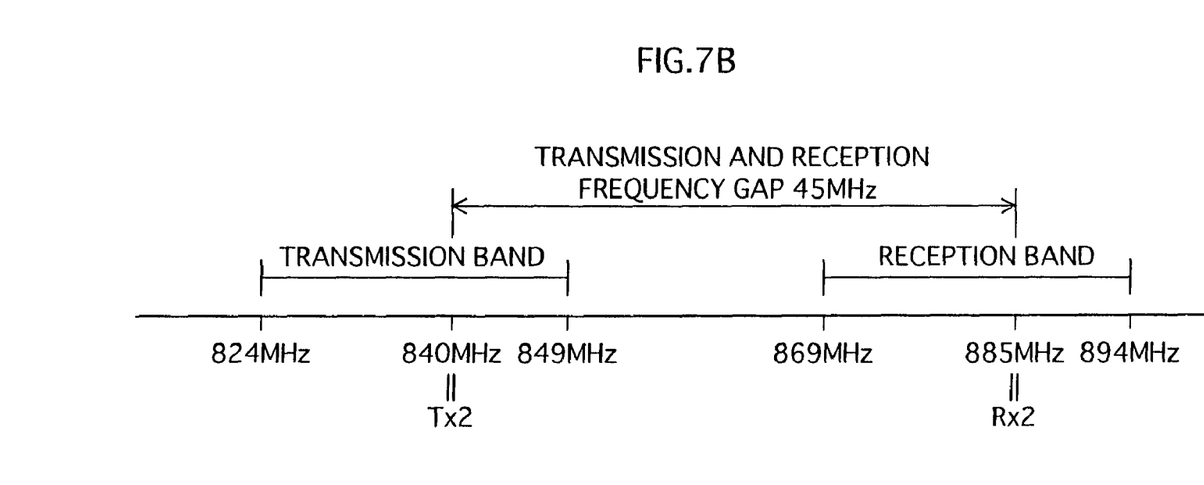
FIG. 7B shows the cellular communications frequency band.

In such a case, the transmission frequency is Tx2=840 MHz, and the reception frequency is Rx2=885 MHz.

When communication is being performed using the cellular-use RF unit 20 and the camera ASIC 60 is operated, the camera clock of 3.10 MHz is supplied to the camera module 62.

Figure 8B:
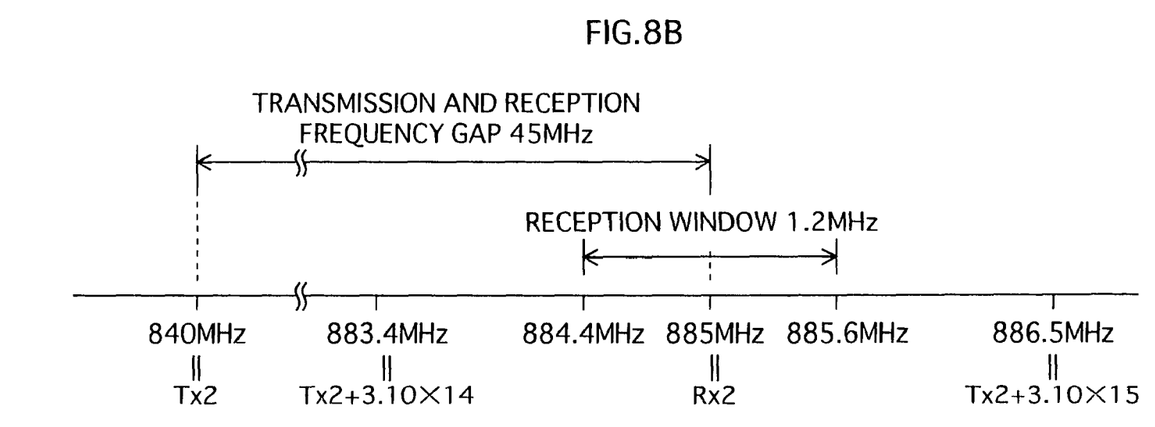
FIG. 8B shows an example of the relationship between the cellular reception frequency and the intermodulation product frequency.

The relationship between the sum of the transmission frequency and the $n^{th}$ harmonic of the camera clock frequency and the reception frequency Rx2 at this point is that shown in FIG. 8B.

The sums of the transmission frequency Tx2 and the $n^{th}$ harmonic of the camera clock frequency in the region of the reception frequency Rx2 are approximately 883.4 MHz (=Tx2+3.10×15) and approximately 886.5 MHz (=Tx1+3.10×15) respectively. These two values are each separated from the reception frequency Rx2=885 MHz by approximately 1.5 MHz.

The reception circuit of the cellular-use RF unit 20 uses an RF filter to extract reception signals from a reception window (884.4 MHz to 885.6 MHz), which is centered on a target value of reception frequency Rx2 and is 1.2 Mhz in width.

The two values, 883.4 MHz and 886.5 MHz fall outside the reception window which ranges from 884.4 MHz to 885.6 MHz inclusive, and the RF filter of the cellular-use RF unit 20 is therefore able remove signals having frequencies of these values. Consequently, interference does not occur.

Supplementary Remarks

A mobile telephone that is one embodiment of the present invention is described above, but the present invention is not limited to the above embodiment and further includes the following modifications.

Figure 9:
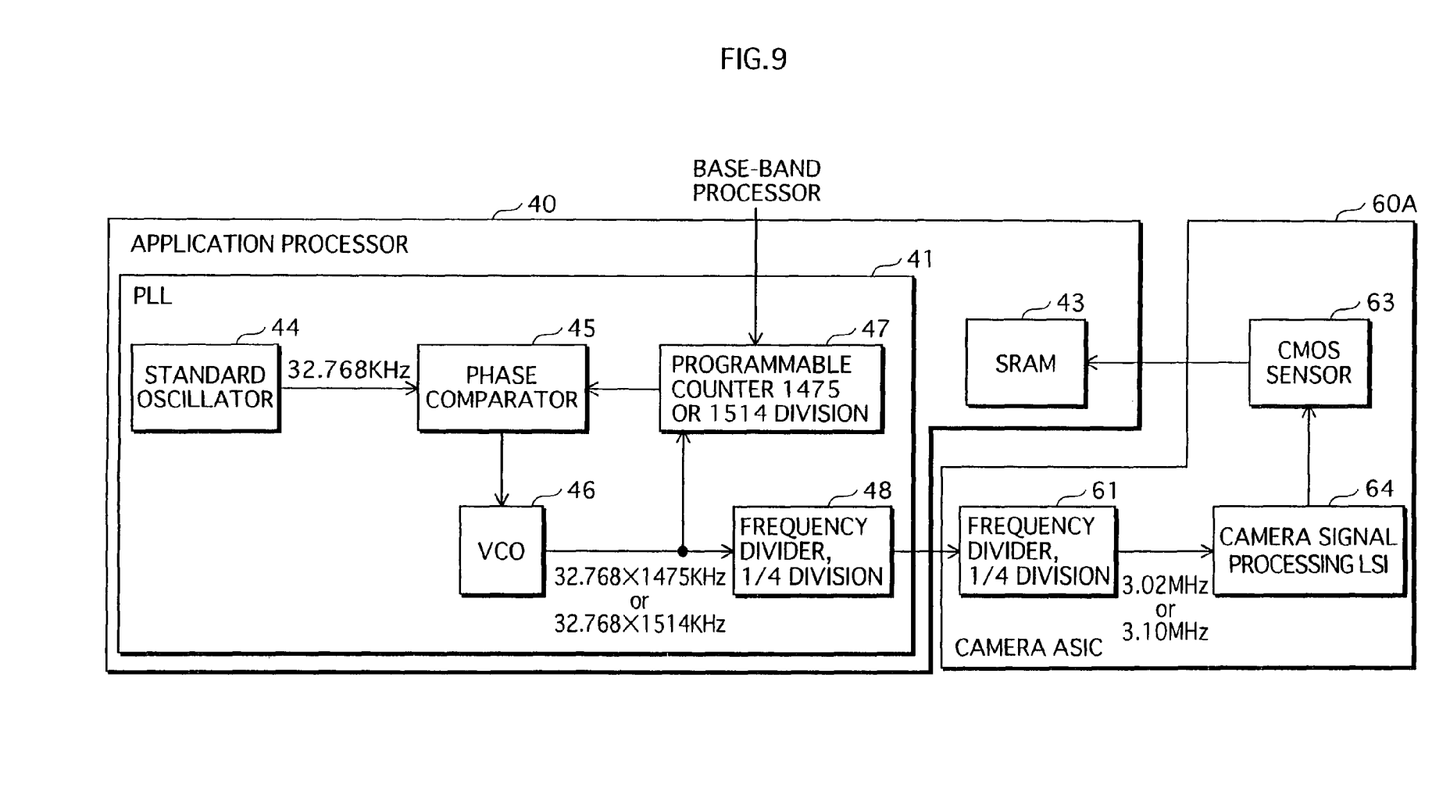
FIG. 9 shows the construction of a camera ASIC 60A.

(1) The camera ASIC of the mobile telephone may be of the kind of construction shown in FIG. 9. A Camera ASIC 60A shown in FIG. 9 is equipped with camera signal processing LSI 64 which includes the functions of the CPU 42 and the camera module 62.

(2) The construction of PLL circuit 41 is not, provided that two differing clock frequencies can be outputted, limited to being that described above, and other constructions may be used. For example the PLL circuit may include two oscillators, each of which provides an oscillating clock signal of a different frequency.

(3) The present invention can be applied to a wireless communications terminal that performs communication through the selective use of a wireless communications method from a plurality of FDD methods, each of which has a different transmission and reception frequency gap. FDD method wireless communication methods include GSM (Global System for Mobile Communications) method, DCS (Digital communication System) method, and the like.

(4) Each of the frequencies of the camera clock selectively supplied to the camera module 62 may be any frequency for which the difference between an $n^{th}$ harmonic and the transmission frequency of the signals transmitted by the transmissions unit falls outside the frequency band received by the reception unit.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A camera-equipped wireless communications terminal, comprising:
   a communications unit operable to communicate with a wireless base station by selective use of one of a plurality of FDD communications methods, each having a different gap between a transmission frequency band and a reception frequency band;
   a camera module operable to receive a clock signal and perform image capture; and
   a clock supplying unit operable to vary a frequency of the clock signal depending on the selected FDD communications method and supply the clock signal to the camera module, wherein
   the communications unit transmits a signal of a frequency within a transmission frequency band of the selected FDD communications method, and receives a signal of a frequency within a reception frequency band of the selected FDD communications method, and
   the frequency of the clock signal supplied to the camera module by the clock supplying unit is varied such that a sum of, or difference between, an nth harmonic, where n is a natural number, of the frequency of the clock signal and the frequency of the signal transmitted by the communications unit is outside the reception frequency band.

2. The camera-equipped wireless communications terminal of claim 1, wherein
   the clock supplying unit is a PLL frequency synthesizer that selectively generates one of a plurality of clock signals that differ in frequency.

3. The camera-equipped wireless communications terminal of claim 1, wherein
   the clock supplying unit
   includes a plurality of oscillators, each of which generates a clock signal that differs in frequency from the clock signals generated by the other oscillators, and
   selectively supplies, depending on the selected FDD communications method, one of the plurality clock signals to the camera module.

4. A clock signal supplying method used in a camera-equipped wireless communications terminal that includes a communications unit and a camera module, wherein
   the communications unit communicates with a wireless base station by selective use of one of a plurality of FDD communications methods, each of which has a different gap between a reception frequency band and a transmission frequency band, and
   the clock signal is supplied to the camera module and is varied depending on the selected FDD communications method, wherein
   the communications unit transmits a signal of a frequency within a transmission frequency band of the selected FDD communications method, and receives a signal of a frequency within a reception frequency band of the selected FDD communications method, and
   the frequency of the clock signal supplied to the camera module, by a clock supplying unit, is varied such that a sum of, or difference between, an nth harmonic, where n is a natural number, of the frequency of the clock signal and the frequency of the signal transmitted by the communications unit is outside the reception frequency band.

* * * * *